(No Model.)
O. C. WHITE.
ADJUSTABLE JOINT.
No. 546,459. Patented Sept. 17, 1895.
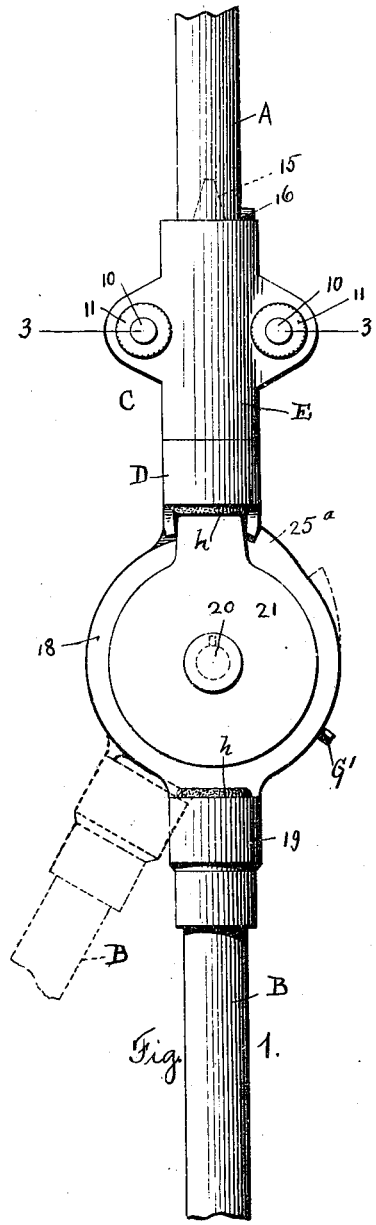
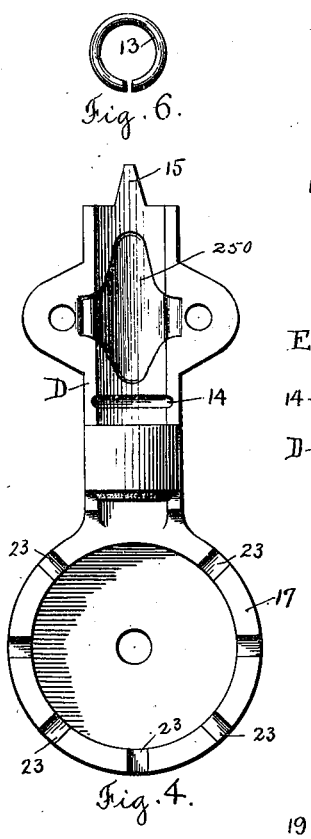
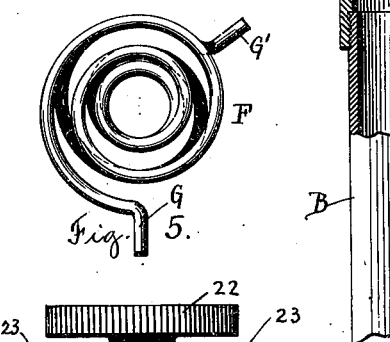
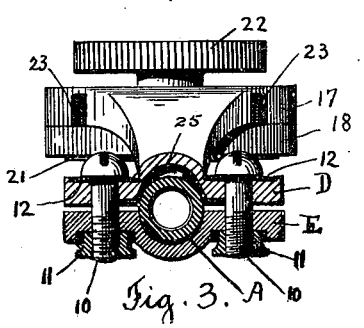
Witnesses.
Chas. F. Schnell
W. J. Baldwin
Inventor.
O. C. White,
By
Southgate & Southgate
Attorneys

UNITED STATES PATENT OFFICE.

OTIS C. WHITE, OF WORCESTER, MASSACHUSETTS, ASSIGNOR TO THE O. C. WHITE COMPANY, OF SAME PLACE.

ADJUSTABLE JOINT.

SPECIFICATION forming part of Letters Patent No. 546,459, dated September 17, 1895.

Application filed January 19, 1895. Serial No. 535,475. (No model.)

*To all whom it may concern:*

Be it known that I, OTIS C. WHITE, a citizen of the United States, residing at Worcester, in the county of Worcester and State of Massachusetts, have invented a new and useful Improvement in Adjustable Joints, of which the following is a specification.

The object of my invention is to provide a strong, simple, and durable joint for adjustably connecting rods or pipe sections, and the especial object of my invention is to provide an inexpensive and efficient combined swivel and elbow joint which can be turned and adjusted to any desired position.

To these ends my invention consists of the parts and combinations of parts as hereinafter described, and more particularly pointed out in the claims at the end of this specification.

In the accompanying drawings, Figure 1 is a side elevation of an adjustable joint constructed according to my invention. Fig. 2 is a sectional view of the same. Fig. 3 is a transverse sectional view taken on the line 3 3 of Fig. 1; and Figs. 4, 5, 6, and 7 are detail views to be hereinafter referred to.

Referring to the drawings and in detail, A and B designate the rods or pipe-sections, which are connected by a joint constructed according to my invention. Supported by and rotatably mounted on the end of the pipe A is a two-part socket C. The two-part socket C consists of a body portion or casting D and a removable cover-plate E. The parts D and E are provided with a cylindrical recess and may be adjustably clamped into frictional engagement with the pipe A by means of the clamping-screws 10, the knurled or milled nuts 11, and the spring-washers 12, the clamping-screws extending through perforated ears or lugs, as shown most clearly in Fig. 3. The two-part socket C and the pipe A are secured together longitudinally by means of a wire ring 13, which is secured in a circumferential groove near the end of the pipe A and is adapted to fit into and engage a groove 14 in the two-part socket. By means of this construction it will be seen that the pipe and the two-part socket are secured together longitudinally, while at the same time the socket may turn or swivel upon the pipe A and may be frictionally held in the desired adjusted position.

To limit the motion of the parts and to prevent the socket from turning completely around upon the pipe A, the casting or body portion D of the socket is provided with a stop or projection 15, and the pipe A is provided with a pin or lug 16, which is located in a position to engage the stop 15 and to limit the relative motion of the parts.

As shown most clearly in Fig. 3, it is to be noted that the recesses in the casting D and the cover-plate E are formed upon a radius which is smaller than that of pipe A. By means of this construction the parts D and E will be slightly separated when they are secured in place and will allow a slight take-up to compensate for the wear. It is also to be noted that by means of this construction the socket C will contact with and engage a portion only of the periphery of the pipe A. I prefer this construction, as I have found in practice that when a socket having a recess of the same diameter as the pipe is employed the parts are liable to become stuck and cannot be readily turned to the desired position.

The parts as thus far described have been found in practice to form a very simple and efficient form of swivel-joint; but in order to compensate for any imperfections in the surface of the pipe I preferably provide a spring 25, as shown most clearly in Fig. 7, which is secured in a socket 250 in the casting D.

The spring 25 is of a substantially cross shape, and its tension may be adjusted by means of the clamping-nuts 10, which secure the parts of the two-part socket together, or, if preferred, a small set-screw may be tapped into the casting D to directly engage the back of the spring 25. The elbow-joint, which is combined with and used in connection with the swivel-joint above described, consists, essentially, of two concentric disks 17 and 18, which are offset or located out of the line of the pipes A and B. The disk 17 is carried by and forms a part of the casting D, and the disk 18 is provided with a tubular boss or projection 19, into which the pipe B is threaded. The concentric disks 17 and 18 are adjustably clamped into frictional engagement by means of a clamping-bolt 20, a spring-washer 21, and a threaded clamping-nut 22. The parts which constitute the elbow-joint as thus far described are of substantially the same construction as shown in my Letters Patent No. 505,585, and need not be herein described further at length. As shown most clearly in Fig. 1, the disk 18 is provided with a lug or stop 25ª, which will engage the casting D and limit the relative movement of the parts.

In order to counterbalance the weight of the pipe B and the parts or fixtures which may be carried thereby, I preferably provide a coiled spring F, which may be secured in place in a socket or recess formed in the abutting faces of the concentric disks 17 and 18. The counterbalancing or coiled spring F is preferably made in the form of a double spiral, as most clearly illustrated in Fig. 5, and one end of the spring, as G, fits into and is secured in a socket 24 of the disk 18, while the other end of the spring, as G', may be adjusted to engage any one of a series of notches 23 in the disk 17. By means of this construction the tension of the spring F can be varied or adjusted to counterbalance the weight of different attachments which may be carried by the pipe B. When the adjustable joint, as thus constructed, is to form part of a fixture for supporting an electric light, the wires may pass through the pipes A and B, and the joint is preferably provided with bushings or collars *h* of insulating material, as shown.

One feature of particular importance in an adjustable joint constructed according to my invention resides in the fact that the parts are so proportioned and secured together that very little machine-work or nice fitting is required, and in practice I have been able to construct an efficient and satisfactory joint from ordinary unfinished castings.

While my adjustable joint has been especially designed to form part of a fixture for supporting electric lights, it is obvious that it may be employed with advantage for many other purposes.

I am aware that changes may be made in the construction of my improved joint by those who are skilled in the art, and I do not wish, therefore, to be limited to the construction which I have shown and described; but What I do claim, and desire to secure by Letters Patent of the United States, is—

1. As an article of manufacture, a frictional swivel joint comprising a rod or pipe section, a two-part socket fitting upon said pipe, means for holding these parts in longitudinal engagement, and means for securing the parts of said socket together, and for adjustably clamping said socket into frictional engagement with said pipe, substantially as described.

2. A frictional swivel joint comprising a rod or pipe section, a two-part socket fitting on said pipe, a ring fitted into grooves in said socket and pipe, screws for securing the parts of said socket together, and spring washers mounted on said screws, and forming an adjustable spring tension device for adjusting the frictional contact between said socket and pipe, substantially as described.

3. A combined swivel and elbow joint comprising a two-part socket constructed to rotatably engage a rod or pipe section, means for securing the parts of said socket together and for adjustably clamping said socket into frictional engagement with the pipe, a two-part elbow joint, and means for adjustably clamping the parts of said elbow joint into frictional engagement, substantially as described.

4. An elbow joint comprising two concentrically pivoted disks, means for adjustably clamping said disks into frictional engagement, and a counter-balancing spring made in the form of a reversely coiled double spiral secured in place between said disks, one end of the spring being secured to one disk, and the other end of said spring being arranged to engage any one of a series of recesses in the other disk, substantially as described.

In testimony whereof I have hereunto set my hand in the presence of two subscribing witnesses.

OTIS C. WHITE.

Witnesses:
H. E. HILL,
PHILIP W. SOUTHGATE.